United States Patent [19]
Ablett et al.

[11] B 3,986,298
[45] Oct. 19, 1976

[54] SPRAY DEVICE

[75] Inventors: David Alan Ablett, Midhurst; Robin Gordon White, Haslemere, both of England

[73] Assignee: Imperial Chemical Industries Limited, London, England

[22] Filed: July 25, 1974

[21] Appl. No.: 491,776

[44] Published under the second Trial Voluntary Protest Program on March 16, 1976 as document No. B 491,776.

[52] U.S. Cl. ............................. 47/1.7; 239/150; 239/165
[51] Int. Cl.[2] ........................................ A01M 21/00
[58] Field of Search ............ 239/150, 164; 47/1.7, 47/1.5, 1.44, 1.43

[56] References Cited
UNITED STATES PATENTS

| | | | |
|---|---|---|---|
| 809,046 | 1/1906 | Collins | 47/1.7 |
| 899,404 | 9/1908 | Iten | 47/1.44 X |
| 1,188,131 | 6/1916 | Agee | 239/150 |
| 1,454,824 | 5/1923 | Stubfors | 47/1.7 |
| 1,509,340 | 9/1924 | Corson | 47/1.44 X |
| 1,961,877 | 6/1934 | Gars | 47/1.44 X |
| 1,970,984 | 8/1934 | Smith | 47/1.7 |
| 2,542,498 | 2/1951 | Forbes | 47/1.44 X |
| 3,016,653 | 1/1962 | Gardner | 47/1.7 |
| 3,237,346 | 3/1966 | Watts | 47/1.7 |

FOREIGN PATENTS OR APPLICATIONS 1,152,847   5/1969   United Kingdom

*Primary Examiner*—Robert E. Bagwill
*Attorney, Agent, or Firm*—Cushman, Darby & Cushman

[57] ABSTRACT

A spray device for applying liquid preparations to vegetation comprises a roller-shaped vegetation presser element of adjustable length rotatably carried between the lower ends of two parallel inclined support arms which are adjustable toward and away from each other and which are hinged at their upper ends for swinging movement in a vertical plane, and a spray nozzle supported on at least one of the arms for vertical and horizontal adjustment and located so as to direct a spray toward the area which has just been traversed by the presser element.

10 Claims, 5 Drawing Figures

SPRAY DEVICE

This invention relates to a spray device, and more particularly to a spray device suitable for applying a herbicidal preparation to unwanted vegetation.

Frequently weeds and other unwanted vegetation may grow to a height which makes it difficult to effectively apply a herbicidal preparation. It has been proposed to cut the vegetation first and to apply the preparation to the weed stubble to prevent regrowth. This method however is not altogether successful because the weed stubble is often obscured by the debris of foliage left after the cutting operation. What is desired is a method of applying the herbicidal preparation close to the base of the weed stems without cutting the weeds first. Penetration of the preparation is enhanced if the weed stems are bruised or otherwise damaged in some way.

According to the present invention a spray device comprises a roller-shaped presser element having longitudinally arranged external ribs, the presser element being capable of traversing the area to be sprayed, and a spray nozzle to which is attached conduit means for delivering thereto a liquid to be sprayed, said nozzle being located so as to direct the spray towards the area which has just been traversed by the presser element.

As the presser element traverses an area where weeds and other unwanted vegetation are growing, the weeds are pressed down by the rolling action of the presser, the longitudinal ribs thereon causing bruising of at least the softer stems. As the presser element continues its traverse the stem bases and lower parts of the vegetation emerge from under the presser element whilst the upper parts are still held down by the presser element, and the spray being delivered by the nozzle is able to contact the lower regions of the stems before the upper parts of the vegetation emerge. The effect of the passage of the roller is to prevent the treated vegetation springing back towards its former growing position, so that adjacent crop plants are not accidentally contacted by the herbicide on the weeds.

The presser element may be a single roller element of fixed or adjustable length. Similarly the position of the nozzle may be fixed or may be variable in either or both horizontal and vertical directions.

The device may be attached to the front or rear if a vehicle, for example a tractor, or may be propelled by hand. Several of the presser elements and their associated nozzles may be arranged side by side on a single support, this arrangement being particularly advantageous in inter-row weed control in standing crops such as maize and soya. When used in row crops side guards to prevent drift of spray onto the crop plants may be attached.

In order that the invention may be more clearly understood some specific embodiments thereof will now be described with the aid of the accompanying drawings, in which.

Figure 1:
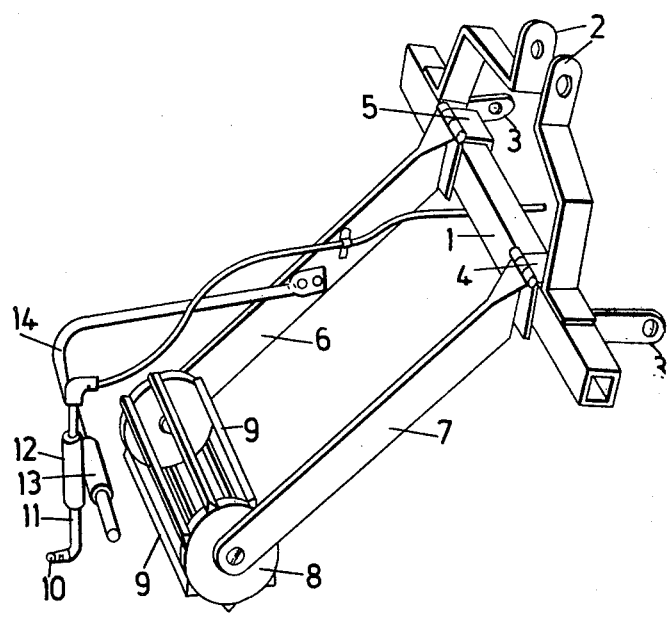
FIG. 1 is a perspective view of a spray device according to the invention having a single non-adjustable roller-shaped presser element.

In the device shown in FIG. 1 a supporting bar 1 is provided with means 2, 3 for attachment to a tractor (not shown). Two brackets 4, 5 pivotally support two arms 6, 7 between which is pivotally supported a presser element 8. This element comprises two circular end plates and a plurality of ribs 9 of angular construction linking them. A spray nozzle 10 attached to the lower end of tube 11 is slidably supported in a sleeve 12, which is welded to a second sleeve 13, arranged at right angles thereto. Sleeve 12 is mounted on support bar 14 which is fixed at one end to arm 6. Conduit supplies spray liquid to nozzle 10 from a reservoir (mounted on the tractor) via a pump operated by the power take off of the tractor.

Figure 2:
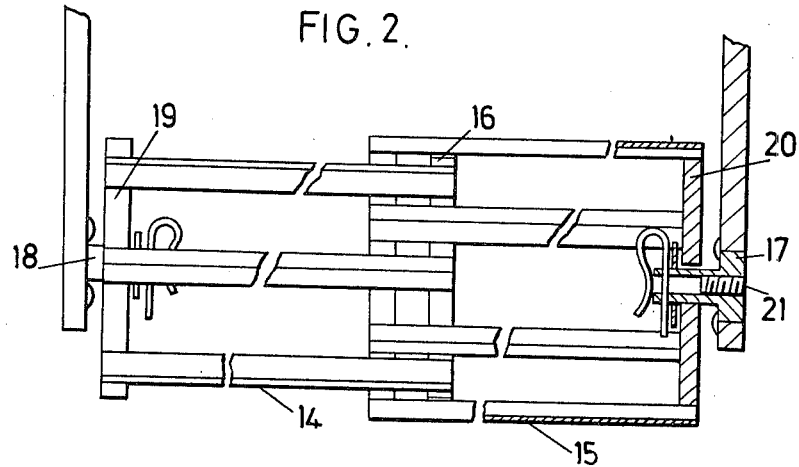
FIG. 2 is a detailed partially sectional view of a longitudinally adjustable roller-shaped presser element.

FIG. 2 shows in detail a roller-shaped presser element which is longitudinally adjustable. The presser element is made up of two independent parts 14, 15, each similar to the presser element described in the device of FIG. 1, but constructed in such a way that the end plate 16 of one part is capable of a sliding movement within the cage formed by the ribs and end plates of the other part, and vice versa. The actual width of the element is fixed by the clamping of the brackets 4, 5 on the supporting bar 1. Adjustment of the element is therefore possible to adapt the device for use in crops of differing inter-row spacing.

The arrangement of FIG. 2 also shows the way in which the roller-shaped presser element is mounted in the device. Short axles 17, 18 are welded into the arms 6, 7 and the presser element end plates 19, 20 are centrally apertured to receive the axles, the element being secured on the axle by means of a washer and spring clip. The axles are hollow and threaded internally at the outer end 21 to provide a fixing point for a side guard system.

Figure 3:
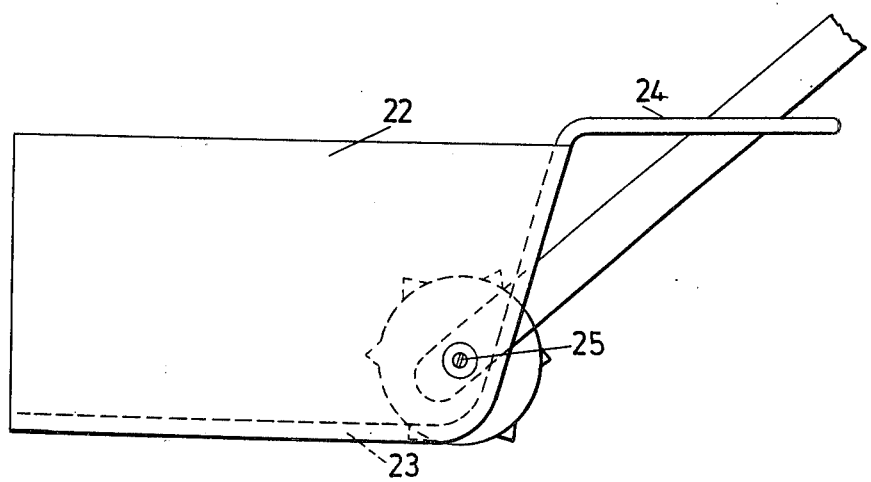
FIG. 3 and FIG. 4 show spray devices fitted with two different kinds of side guards.
Figure 4:
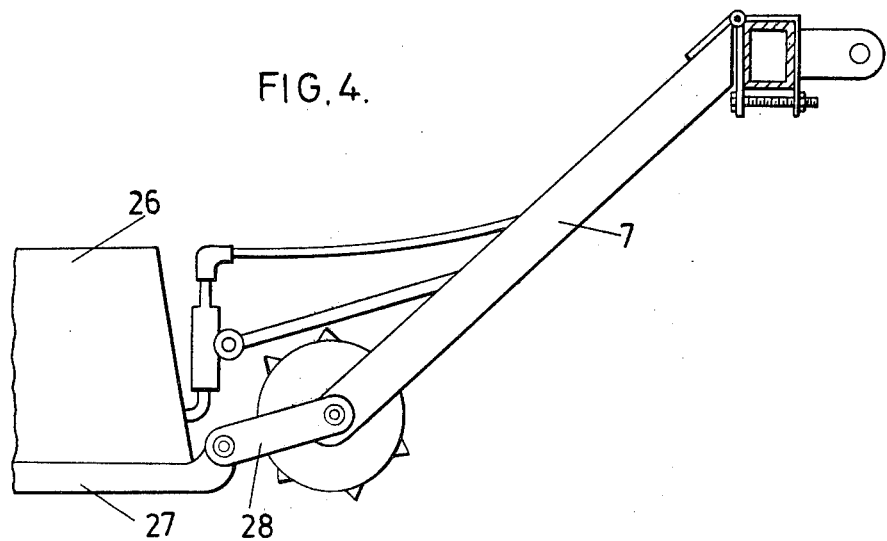
Figure 5:
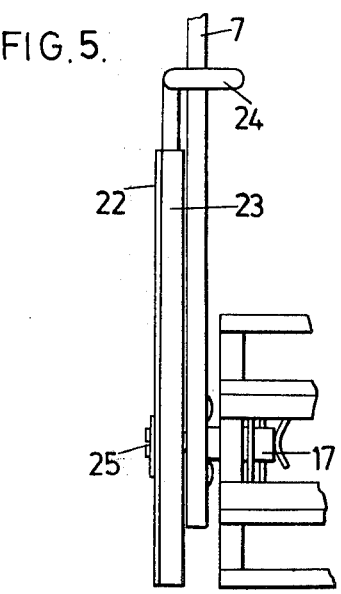
FIG. 5 is a front view of one side of the device of FIG. 3.

Alternative guard systems are shown in FIGS. 3, 4 and 5. In FIGS. 3 and 5 a side guard is comprised of a flat metal plate 22 having a tubular support 23 welded to its front and lower edges. This support improves the rigidity of the guard and provides a surface to improve sliding contact with the ground. The top end of the tubular support provides an anchorage for a hook-shaped bar 24 which extends forwards and inwards from the guard and which acts as a retaining means for the guard when the device is lifted clear of the ground, for example during transit or when turning at the end of a row. The bar 24 also acts to deflect the crop as the device moves along a row so that the crop foliage does not catch between the arms 6, 7 and the side guards. The guards are pivotally attached to the rest of the device by means of a threaded bolt 25 which engages the internal threading in the axles 17, 18.

In the guard system shown in FIG. 4 each guard comprises a flat plate 26 mounted on a shoe 27, the front of the shoe being pivotally linked to one end of a bar 28 the other end of which is pivotally attached to the rest of the device at the outer end of the axle. In another modification the pivotal attachment to the device would be adjacent to the top of the arms 6, 7. This form of guard system has the advantage of independently following the ground contours, whereas that shown in FIGS. 3 and 5 cannot move independently of the presser element.

We claim:

1. A spray device for applying a herbicidal spray to an area of unwanted vegetation which comprises: a support; a pair of horizontally spaced apart parallel arms each of which is connected hingedly at one end to the support for swinging movement about a horizontal axis; a roller-shaped presser element having longitudinally arranged external ribs, said element being connected between the other ends of the arms for rotation about a horizontal axis; a spray nozzle connected by support means to at least one of the arms, and located so as to direct the spray towards the area which has just been traversed by the presser element; and conduit means to deliver the spray to the nozzle from a reservoir.

2. A spray device as in claim 1 wherein said roller-shaped presser element is of adjustable length.

3. A spray device as in claim 1 further including horizontally spaced-apart side guards disposed laterally of said spray nozzle for preventing lateral drift of spray.

4. A spray device as in claim 1 wherein a plurality of said roller-shaped presser elements and a plurality of said spray nozzles are arranged side-by-side.

5. A spray device adapted to be moved over the ground in a forward direction for applying a herbicidal spray to an area of unwanted vegetation comprising: a main support; a pair of horizontally spaced apart parallel arms extending downwardly and rearwardly from said support; hinge means connecting the upper end of each arm to said support for swinging movement in a vertical plane, said hinge-means being adjustable toward and away from each other whereby the spacing between the arms can be adjusted; a roller-shaped vegetation presser element having longitudinally extending external ribs, said element being disposed between the lower ends of said arms and being constructed in at least two sections which are movable relative to each other along the axis of said element; means connecting each section to one of said arms for rotation about the axis of said element; and at least one spray nozzle arranged by means of support means in a position rearwardly of said roller-shaped presser element for spraying vegetation which has been pressed down by said presser element as said device is moved forwardly.

6. A spray device as in claim 5 wherein said support means for said nozzle is supported from at least one of said arms.

7. A spray device as in claim 5 wherein said support means for said nozzle is horizontally and vertically adjustable.

8. A spray device as in claim 5 wherein said main support includes a horizontal rod, said device including two brackets which are independently slidably adjustable along said rod, each of said hinge means being supported on one of said brackets.

9. A spray device as in claim 5 including two side guards disposed laterally of said nozzle for preventing lateral drift of spray, said side guards being pivotally connected to said arms for swinging movement about the axis of said roller-shaped presser element; and retaining means forming part of each side guard for engaging one of said arms in a manner to limit swinging movement of the respective side guard when said device is lifted clear of the ground.

10. A spray device as in claim 5 including two side guards disposed laterally of said nozzle for preventing lateral drift of spray each of said guards being connected to one of said arms by a link having a forward end pivoted to the respective arm and having a rear end pivoted to said guard.

* * * * *